United States Patent [19]

Chapman

[11] 4,430,036
[45] Feb. 7, 1984

[54] THREAD FORMING FASTENER

[75] Inventor: Eugene K. Chapman, South Dartmouth, Mass.

[73] Assignee: Amca International Corporation, Hanover, N.H.

[21] Appl. No.: 385,703

[22] Filed: Jun. 7, 1982

Related U.S. Application Data

[62] Division of Ser. No. 229,450, Jan. 29, 1981, Pat. No. 4,353,233.

[51] Int. Cl.$^3$ .............................................. F16B 25/00
[52] U.S. Cl. ..................................................... 411/416
[58] Field of Search ............... 411/416, 417, 423, 424, 411/411, 412, 263, 308

[56] References Cited

U.S. PATENT DOCUMENTS

| | | |
|---|---|---|
| 2,352,982 | 7/1944 | Tomalis . |
| 3,163,196 | 12/1964 | Hanneman . |
| 3,180,202 | 4/1965 | Kahn . |
| 3,195,156 | 7/1965 | Phipard . |
| 3,262,473 | 3/1964 | Phipard . |
| 3,377,906 | 4/1968 | Phipard ............................ 411/423 |
| 3,685,328 | 8/1972 | Carpenter et al. ..................... 72/88 |
| 3,772,720 | 11/1973 | Yamamoto .......................... 10/10 R |
| 3,800,585 | 4/1974 | Simmons et al. ..................... 72/469 |
| 3,818,749 | 6/1974 | Yankee et al. ....................... 72/469 |
| 3,878,759 | 4/1975 | Carlson ............................. 411/416 |
| 3,918,345 | 11/1975 | Phipard ............................. 411/416 |
| 3,934,444 | 1/1976 | Simons ................................ 72/88 |

FOREIGN PATENT DOCUMENTS 4149 of 1907 United Kingdom ................ 411/417

Primary Examiner—Thomas J. Holko
Attorney, Agent, or Firm—Trexler, Bushnell & Wolters, Ltd.

[57] ABSTRACT

A self-threading fastener has circumferentially spaced thread-forming lobes on its thread and with the thread depth at a maximum at the lobes and a minimum circumferentially between the lobes. A lobe in one turn is circumferentially offset from a lobe in an adjacent turn. The fastener is made on roll-threading dies each having grooves sinusoidally varying in depth frm a maximum at one region to a minimum at a second region. The spacing of the regions is equal to a fraction of the thread pitch multiplied by the cosecant of the thread helix angle.

7 Claims, 10 Drawing Figures

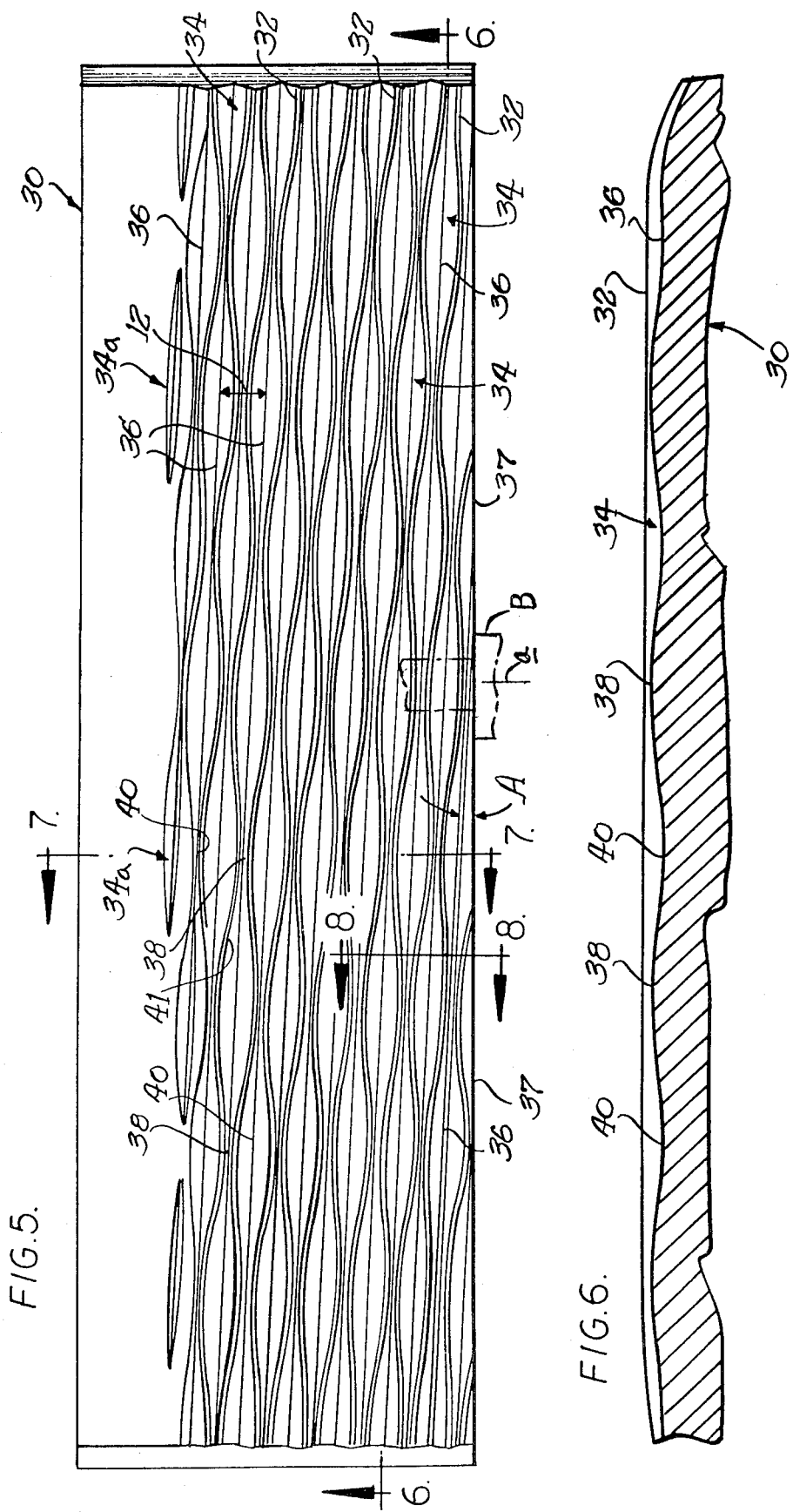

THREAD FORMING FASTENER

This application is a division of application Ser. No. 229,450, filed Jan. 29, 1981, now U.S. Pat. No. 4,353,233.

BACKGROUND OF THE INVENTION

This invention relates to improvements in self-threading fasteners and to roll threading dies used for making such fasteners.

The type of fastener with which the present invention is concerned is one having a cross section in the form arcuate lobular polygon having arcuate sides with intermediate arcuate lobe that form the apices of the polygon. Generally speaking, the polygon has an odd number of lobes and in particular is of arcuate triangular configuration, namely having three equally spaced lobes each turn of the thread. Screws of this type have enjoyed enormous commercial success. Such screws are roll threaded on essentially conventional dies which form the thread on a screw blank of lobular cross section.

Because the screw blank must be of lobular cross section it is necessary to provide suitable tooling for reshaping round wire stock into lobular form. While this reshaping of the wire stock can be done efficiently, the operation must still be carried out, which necessarily increases the cost of production.

Accordingly, it is been proposed to roll thread a blank of circular cross section to form a lobular-threaded screw. The reshaping of the blank into lobular form takes place during the roll-threading operation. One such proposal is shown in U.S. Pat. No. 3,772,720 to Yamamoto. In that patent there is disclosed a method and apparatus in which the dies are formed with transverse grooves which impart to the blank a unique movement during the roll threading, thereby causing the circular blank to be reshaped into a threaded fastener with an odd number of lobes. Another such proposal is made in U.S. Pat. No. 2,352,982 to Tomalis. In that patent there is a general suggestion that the thread is formed on a cylindrical screw blank by the use of dies whose surfaces are not plain but may be considered as being scalloped and grooved for uniform depth along the scallops. Each scallop is to have a chordal length along the die equivalent to one face of the finished screw blank. The die structure in the Tomalis patent is not otherwise disclosed and its construction is unclear and uncertain.

OBJECTS AND SUMMARY OF THE INVENTION

It is an object of this invention to provide a lobular thread-forming fastener of novel configuration that can be roll threaded from a blank of circular cross section.

A further object of this invention is to provide a roll-threading die for use with a companion die to roll-thread the lobular screw.

The fastener of the present invention has a shank portion with a continuous helical roll thread formation of uniform pitch, the crest of the thread defining a helix including in a plurality of the turns of the thread arcuate regions merging gradually with intermediate arcuate lobes, said lobes having radii of curvature that are less than the radii of curvature of the arcuate regions, said thread having a depth that is at a minimum circumferentially midway between said lobes, said thread having a depth that is maximum at said lobes, and a lobe in one turn of the thread being circumferentially offset from a lobe in an adjacent turn.

The novel roll-threading die comprises a die body having a plurality of longitudinal ridges defining a plurality of grooves, said grooves being of generally V-shaped cross section and having base portions midway between the ridges, the base portions being parallel and inclined at an angle to the axis of a screw blank rolled between a pair of such dies so as to form a helix angle for the rolled thread, each said groove having repeating successive first and second regions along its length and with the groove varying in depth from a minimum at the first region to a maximum at the second region and such that said base portion traces substantially a sinususoidal path, the distance between an adjacent first and second regions being equal to a fraction of the thread pitch multiplied by the cosecant of said helix angle. In the preferred form of the invention this fraction is one-third.

In preferred form of die according to the invention the distance between adjacent first and second regions corresponds to substantially to 120° of arc on the rolled thread, and two adjacent die grooves are longitudinally offset by an amount equal to the thread pitch multiplied by sine of the helix angle. The resultant thread that is rolled on a die couple is one in which the circumferential spacing between adjacent lobes is substantially 240° and circumferential spacing of a lobe from an adjacent region of minimum length is substantially 120°. Lobes that are 720° apart are aligned substantially parallel to the central axis of the screw shank. The resultant screw has a relatively low drive torque while maintaining adequate prevailing torque when the fastener is threaded into a work-piece.

BRIEF DESCRIPTION OF THE FIGURES

FIG. 5 is a top-plan view of a roll-threading die in accordance with the present invention;

FIG. 6 is a fragmentary sectional view taken along line 6—6 of FIG. 5;

DETAILED DESCRIPTION

Figure 1:
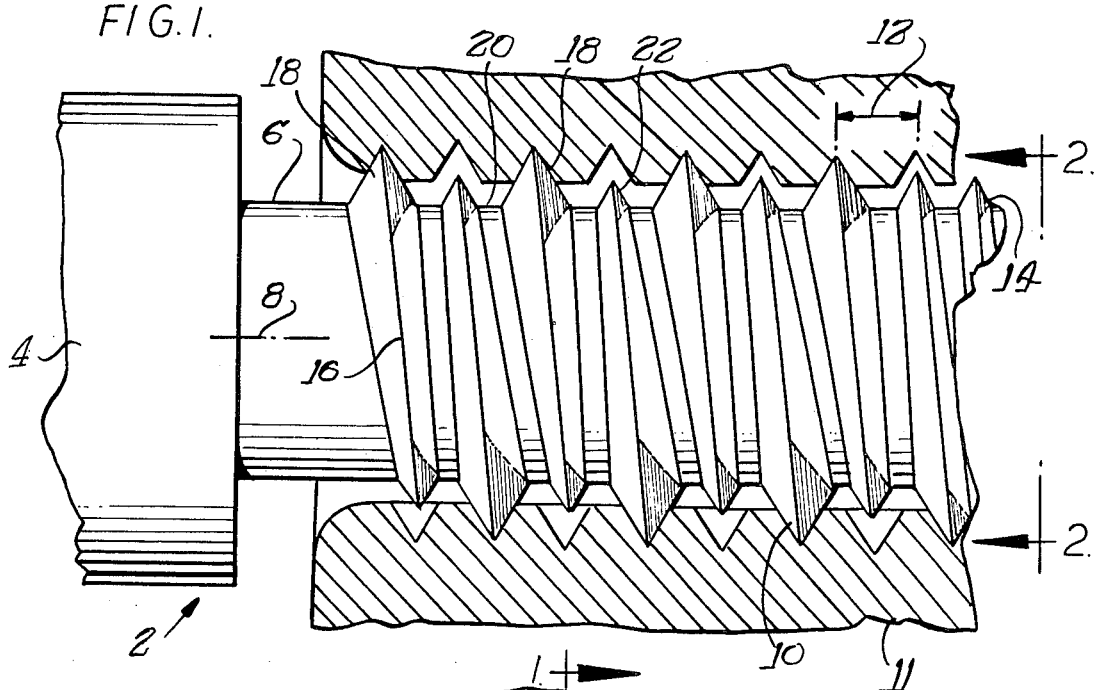
FIG. 1 is a fragmentary sectional view through a fastener of the present invention threaded into a work piece and as seen approximately along the line 1—1 of FIG. 2.

Referring now in more detail to the drawing there is shown a fastener 2 having a head 4 and a shank 6 with a central axis 8. The shank 6 has a continuous helical roll thread 10 of uniform pitch 12. The forward end of the shank 6 includes turns of the thread 10 of declining thread depth to form a tapered lead 14 section at the entrance end of the screw as is customary with self-threading fasteners.

The crest of the thread 10 defines a helix including, in a plurality of turns, arcuate regions 16 merging gradually with intermediate arcuate lobes 18. The lobes 18 have radii of curvature that are less than the radii of curvature of the arcuate regions 16. The lobes 18 provide thread-swaging elements for swaging thread in the work-piece 11 while the arcuate region 16 provide relief portions between the lobes. The thread root 20 is of constant diameter and width and over a number of turns; however, the thread root 20 widens in the tapered lead 14.

Figure 2:
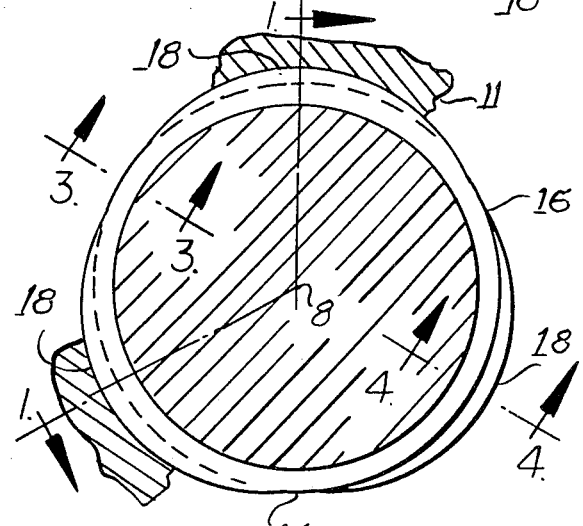
FIG. 2 is a fragmentary sectional view taken substantially along line 2—2 of FIG. 1.

In the form of the invention herein shown, a cross section or end view of the fastener 2 provide a lobular triangular configuration as seen in FIG. 2. The lobular triangular configuration is a preferred form although the invention is not limited to a particular number of lobes per turn of the thread.

Figure 3:
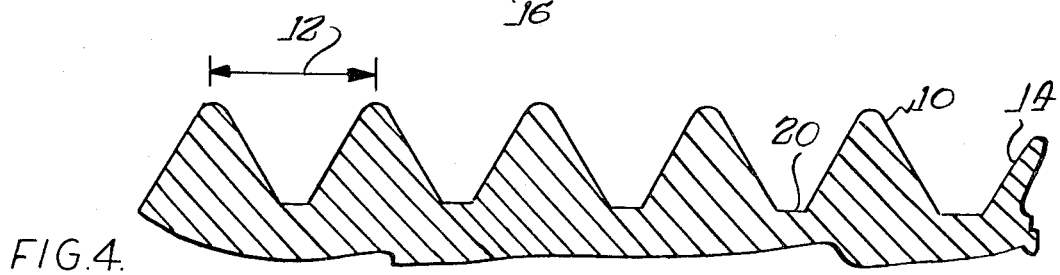
FIG. 3 is a fragmentary sectional view taken along line 3—3 of FIG. 2.
Figure 4:
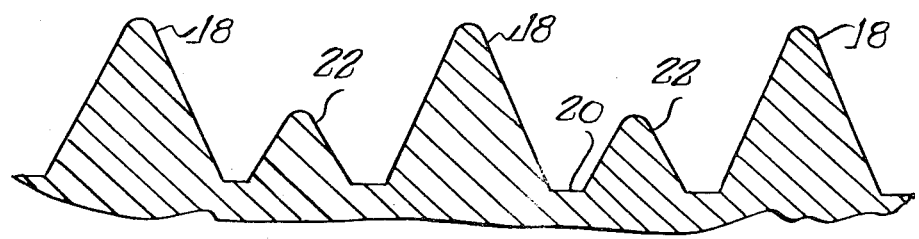
FIG. 4 is a fragmentary sectional view taken along line 4—4 of FIG. 2.

Further with respect to the particular form of fastener shown, it will be noted that upon tracing the path of the thread helix the circumferential spacing between adjacent lobes is substantially 240° and those lobes which are 720° apart are substantially aligned parallel to the central axis 8 of the shank portion 6. This will be apparent from FIGS. 3 and 4 wherein lobes 18 are shown as being 720° or two thread turns apart. The maximum thread depth is at the peak point of each lobes 18 and the minimum thread depth is the region 22 intermediate lobe 16. Thus, just as adjacent lobes 18 along the helix are 240° apart so are the regions 22 of minimum thread depth 240° apart, and those regions 22 that are 720° apart are aligned substantially parallel with the central axis 8. Consequently, the thread will progress from a peak lobe condition through 120° to a minimum thread depth region 22 and for the next 120° the thread depth will progressively increase back to a peak lobe condition. As the thread goes from a maximum thread depth to a minimum thread depth, during the first 120° of thread turn thread will go through a condition of average depth as shown in FIG. 3. FIGS. 3 and 4 are sectional views which are 180° apart and represent a position in which the thread depth is constant over the length of the shank. Viewed another way, the thread goes from a profile in FIG. 3 to that in FIG. 4 each 60°. Of course, this average thread depth condition repeats every 120° counterclockwise from the section line 3—3 in FIG. 2.

The fastener 2 is fabricated by a pair of like roll threading dies, one of which is shown in FIGS. 5–10. In the roll threading operation a conventional screw blank of circular cross section is forged into the lobular fastener.

As seen in FIG. 5, the die body 30 is of rectilinear shape having a plurality of longitudinal ridges 32 defining a plurality of longitudinal grooves 34. The grooves are of generally V-shaped cross section having base portions 36 midway between the ridges 32. As best seen in FIG. 5, the base portions 36 are parallel and are inclined at an angle to the end surface 37 die body 30 to form a helix angle A for the rolled thread. Since the central axis a of the cylindrical screw blank B (shown in broken lines in FIG. 5) being rolled between the dies will be perpendicular to the end surface 37 the base portions 36 will be disposed at the helix angle A to the being-formed thread.

Figure 7:
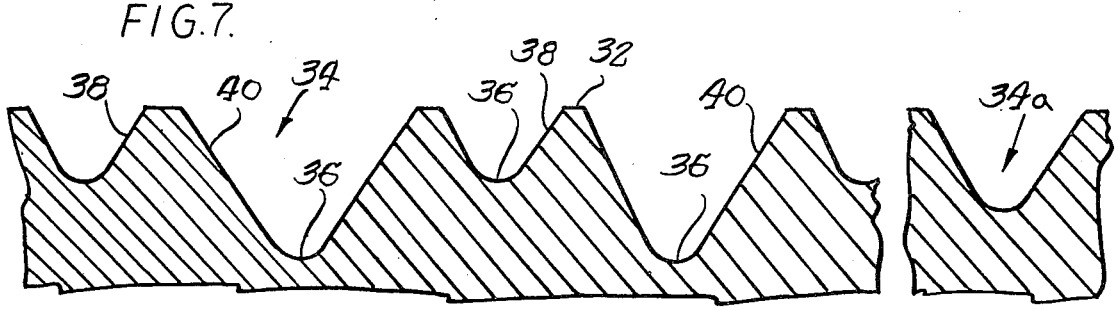
FIGS. 7 and 8 are fragmentary sectional views taken along lines 7—7 and 8—8 respectively of FIG. 5.
Figure 10:
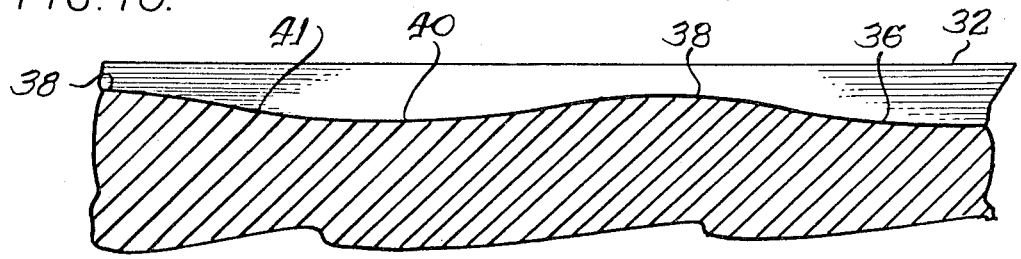
FIG. 10 is a fragmentary sectional view taken along line 10—10 of FIG. 9.

Alongs its length each groove 34 is periodically narrowed and widened from first or narrow region 38 to a second or wide region 40. The progression from the first region 38 to the second region 40 and back to the first region 38 is along the length of the groove 34. As best seen in FIG. 7 the groove is widest and deepest at the second region 40 and is narrowest and shallowest at the first region 38. This construction is due to the fact that the base portion 36 of the groove traces substantially a sinusoidal path as best shown in FIGS. 6 and 10, with the groove depth being a minimum at the first region 38 and the maximum at the second region 40. The distance between an adjacent first and second region is equal to a fraction of the thread pitch 12 multiplied by the cosecant of the helix angle. In the form of the invention disclosed this fraction is one-third of the thread pitch, and so the distance between a first region 38 and a second 40 is one-third of the thread pitch 12 multiplified by the cosecant of helix angle A.

Figure 8:
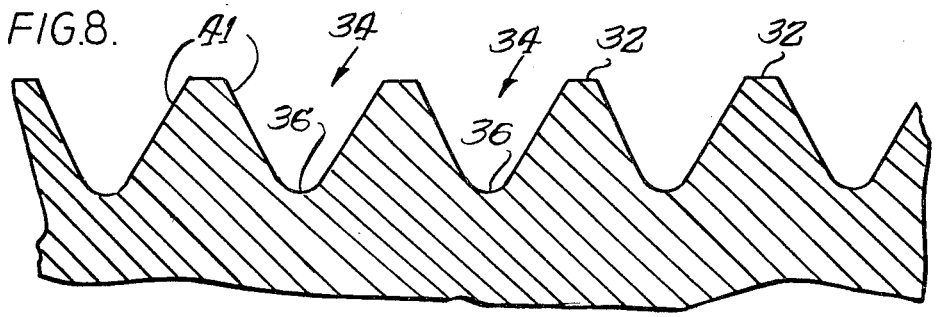
Figure 9:
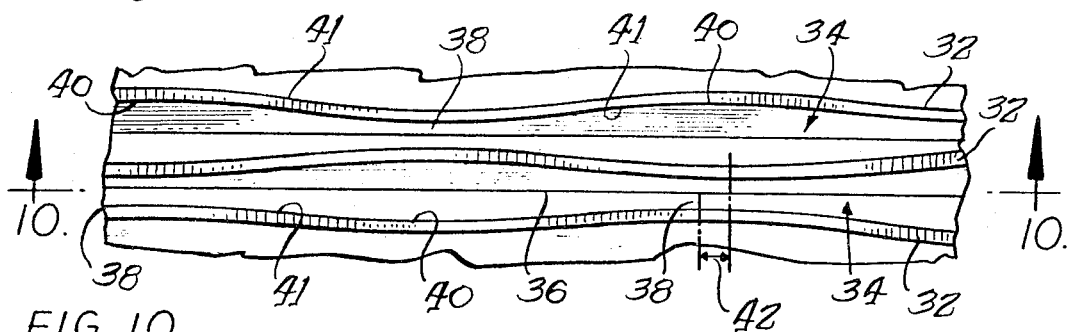
FIG. 9 is an enlarged fragmentary portion of the die of FIG. 5.

As best seen in FIGS. 5 and 9 each groove 34 is longitudinally offset from an adjacent groove. This construction is the result of the fabrication of the die with a milling cutter. Thus, a milling cutter would be controlled by a suitable cam arrangement whereby the cutter would rise and fall along a harmonic path indicated by the base portion 36 in FIG. 10. Since the milling cutter is of V-shape, the deeper the cut the wider will be the groove 34. The deep and wide cuts form the regions 40 while the shallow and narrower cuts form the regions 38. Halfway between a region 40 and a region 38 (eg., regions 41) the grooves will be equally sized and of average depth, as shown in FIG. 8. In the form of the invention illustrated, the cross section of FIG. 8 is 60° of rotation offset from the cross section of FIG. 7. Consequently, in every 120° of rotation a thread cross section will be an average depth as in FIG. 3. To create this condition the grooves 34 must be "offset" by a suitable amount, and the milling cutter is indexed to accomplish this result. Consequently, before a groove 34 is milled the position of the cutter relative to the proceeding cut is advanced (or retarded) an amount equal to the thread pitch multiplied by the sine of the helix angle A. This offset or indexing is indicated at 42 in FIG. 9 wherein it is shown that the region 40 of one groove is offset from the adjacent region 38 in the adjacent groove by the dimension 42.

Somewhat narrower grooves 34a are shown in FIGS. 5 and 7. These grooves 34a are for the purpose of rolling the tapered lead portion 14 of the thread 10. Hence, grooves 34a are shallower and narrower than are the grooves 34. Thus, the die regions shown in FIG. 7 insofar as the fully developed thread is concerned, forge thread cross sections corresponding to FIG. 4 while the die sections shown in FIG. 8 roll thread cross sections shown in FIG. 3. The ridges 32 form the thread 10 with a constant root diameter.

The invention is claimed as follows:

1. A thread-forming fastener having a shank portion with a continuous helical roll-threaded formation of uniform pitch, the crest of said thread defining a helix including in a plurality of turns of the thread arcuate regions merging gradually with intermediate arcuate lobes, said lobes having radii of curvature that are less than the radii of curvature of the arcuate regions, said thread having a depth that is at a minimum circumferentially midway between said lobes, said thread having a depth that is at a maximum at said lobes, and a lobe in one turn of the thread being circumferentially offset from the nearest lobe in an adjacent turn and in which said offset is one-half the circumferential spacing of two adjacent lobes.

2. A thread-forming fastener according to claim 1 in which the thread root is of constant width over a number of turns.

3. A thread-forming fastener according to claim 1 in which said thread root is of constant diameter.

4. A thread-forming fastener according to claim 1 in which the circumferential spacing between adjacent lobes is substantially 240° and the circumferential spacing of a lobe from an adjacent region of minimum thread depth is substantially 120°.

5. A thread-forming fastener according to claim 1 in which there are lobes that are aligned substantially parallel to the central axis of the shank portion, the nearest of two aligned lobes being 720° apart.

6. A thread-forming fastener having a shank portion with a continuous helical roll-threaded formation of uniform pitch, the crest of said thread defining a helix including in a plurality of turns of the thread arcuate regions merging gradually with intermediate arcuate lobes, said lobes having radii of curvature that are less than the radii of curvature of the arcuate regions, said thread having a depth that is at a minimum circumferentially midway between said lobes, said thread having a depth that is at a maximum at said lobes, and a lobe in one turn of the thread being circumferentially offset from the nearest lobe in an adjacent turn, there being lobes that are aligned substantially parallel to the central axis of the shank portion, the nearest of two aligned holes being substantially 720 degrees apart.

7. A thread-forming fastener having a shank portion with a continuous helical roll-threaded formation of uniform pitch, the crest of said thread defining a helix including in a plurality of turns of the thread arcuate regions merging gradually with intermediate arcuate lobes, said lobes having radii of curvature that are less than the radii of curvature of the arcuate regions, said thread having a depth that is at a minimum circumferentially midway between said lobes, said thread having a depth that is at a maximum at said lobes, and a lobe in one turn of the thread being circumferentially offset from the nearest lobe in an adjacent turn, and in which the circumferential spacing between adjacent lobes is substantially 240 degrees and the circumferential spacing of a lobe from an adjacent region of minimum thread depth is substantially 120 degrees.

* * * * *